(12) United States Patent
Kim et al.

(10) Patent No.: US 10,495,078 B2
(45) Date of Patent: Dec. 3, 2019

(54) DEVICE AND METHOD FOR CONTROLLING COMPRESSOR OF VEHICLES TO ACCUMULATE COLD AIR ENERGY IN AN EVAPORATOR DURING A SPEED-REDUCING CONDITION AND USING THE LATTER IN A RELEASE CONDITION

(71) Applicants: Hyundai Motor Company, Seoul (KR); Kia Motors Corporation, Seoul (KR)

(72) Inventors: Jae Woong Kim, Hwaseong-si (KR); Ki Lyong Jang, Suwon-si (KR); Chang Won Lee, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/858,068

(22) Filed: Dec. 29, 2017

(65) Prior Publication Data

US 2018/0119685 A1    May 3, 2018

Related U.S. Application Data

(62) Division of application No. 12/951,505, filed on Nov. 22, 2010, now Pat. No. 9,879,664.

(30) Foreign Application Priority Data

Jun. 30, 2010  (KR) ......................... 10-2010-0063132

(51) Int. Cl.
*B60H 1/00* (2006.01)
*B60H 1/32* (2006.01)
(Continued)

(52) U.S. Cl.
CPC ....... *F04B 35/002* (2013.01); *B60H 1/00764* (2013.01); *B60H 1/00778* (2013.01);
(Continued)

(58) Field of Classification Search
CPC ............ B60H 1/00764; B60H 1/00878; B60H 1/3208; B60H 2001/3266;
(Continued)

(56) References Cited

U.S. PATENT DOCUMENTS 4,193,271 A * 3/1980 Honigsbaum .......... B60H 1/005
165/104.13
4,498,311 A    2/1985 Sakano et al.
(Continued)

FOREIGN PATENT DOCUMENTS

DE        103 43 238 A1    5/2005
DE  10 2004 060 000 B3    4/2006
(Continued)

*Primary Examiner* — Edward F Landrum
*Assistant Examiner* — Daniel C Comings
(74) *Attorney, Agent, or Firm* — Morgan, Lewis & Bockius LLP (57) ABSTRACT

A device for controlling a compressor of vehicles may include a sensor module including a cabin temperature sensor, an outdoor temperature sensor, an evaporator temperature sensor detecting a temperature of cooling medium in an evaporator, a vehicle speed sensor, and a brake sensor, an injector, an air conditioning system including a condenser, an evaporator, the compressor, a temperature control door controlling a temperature of air flowing into a cabin, an intake door selectively distributing an inner air or an outer air into the cabin, and a blower blowing the air to the intake door, and a controller controlling the injector and the air conditioning system, wherein the controller accumulates a cold air energy by increasing an operation of the compressor if a speed-reducing condition occurs, and the air conditioning system uses the accumulated cold air energy by decreas- (Continued)

ing the operation of the compressor if a release condition occurs.

10 Claims, 6 Drawing Sheets

(51) Int. Cl.
*F04B 35/00* (2006.01)
*F04B 49/06* (2006.01)

(52) U.S. Cl.
CPC ....... *B60H 1/00878* (2013.01); *B60H 1/3208* (2013.01); *F04B 49/065* (2013.01); *B60H 1/00835* (2013.01); *B60H 1/00849* (2013.01); *B60H 2001/327* (2013.01); *B60H 2001/3266* (2013.01); *B60H 2001/3272* (2013.01); *B60H 2001/3273* (2013.01); *F04B 2203/0604* (2013.01); *F04B 2203/0605* (2013.01); *F04B 2203/0607* (2013.01); *F04B 2205/10* (2013.01); *F04B 2207/03* (2013.01)

(58) Field of Classification Search
CPC ...... B60H 2001/327; B60H 2001/3272; B60H 2001/3273; F25B 2700/21174
See application file for complete search history.

(56) References Cited

U.S. PATENT DOCUMENTS

| | | | |
|---|---|---|---|
| 5,018,362 A | 5/1991 | Nagase et al. | |
| 5,117,643 A | 6/1992 | Sakurai et al. | |
| 6,330,802 B1 * | 12/2001 | Cummings | B60H 1/00978 62/126 |
| 6,330,909 B1 | 12/2001 | Takahashi et al. | |
| 6,463,749 B2 | 10/2002 | Niimi | |
| 6,688,120 B2 * | 2/2004 | Aoki | B60H 1/005 62/133 |
| 6,691,522 B1 | 2/2004 | Kojima | |
| 6,751,303 B1 | 4/2004 | Masuda et al. | |
| 6,854,513 B2 | 2/2005 | Shirota et al. | |
| 7,100,383 B2 | 9/2006 | Sugesawa et al. | |
| 7,826,961 B2 | 11/2010 | Jinno | |

FOREIGN PATENT DOCUMENTS

| | | |
|---|---|---|
| DE | 10 2007 048 926 A1 | 4/2009 |
| JP | 11-315744 A | 11/1999 |
| JP | 2001-105846 A | 4/2001 |
| JP | 2003-165331 A | 6/2003 |
| JP | 2003-306031 A | 10/2003 |
| JP | 2003-335128 A | 11/2003 |
| JP | 2005-104305 A | 4/2005 |
| JP | 2008-120295 A | 5/2008 |
| JP | 2009-107419 A | 5/2009 |
| KR | 2001-0094391 A | 11/2001 |
| KR | 2005-0069078 A | 7/2005 |
| KR | 10-2006-0072433 A | 6/2006 |
| KR | 10-2009-0131928 A | 12/2009 |
| KR | 10-2010-0044530 A | 4/2010 |
| KR | 10-2010-0068877 A | 6/2010 |

* cited by examiner

DEVICE AND METHOD FOR CONTROLLING COMPRESSOR OF VEHICLES TO ACCUMULATE COLD AIR ENERGY IN AN EVAPORATOR DURING A SPEED-REDUCING CONDITION AND USING THE LATTER IN A RELEASE CONDITION

CROSS-REFERENCE TO RELATED APPLICATION

This application is a Divisional of U.S. patent application Ser. No. 12/951,505, filed Nov. 22, 2010, which claims priority to and the benefit of Korean Patent Application No. 10-2010-0063132 filed in the Korean Intellectual Property Office on Jun. 30, 2010, the entire contents of which applications are incorporated herein for all purposes by these references.

BACKGROUND OF THE INVENTION

Field of the Invention

The present invention relates to a device and a method for controlling a compressor of vehicles. More particularly, the present invention relates to a device and a method for controlling a compressor of vehicles which improves fuel efficiency by accumulating a cold air energy when a speed-reducing condition occurs and using the accumulated cold air energy when a release condition occurs.

Description of the Related Art

Recently, countries tighten exhaust regulations and fuel efficiency regulations so as to retard progress of global warming and to prepare depletion of petroleum resources. In order to enhance fuel efficiency, improvement of auxiliary machinery including a powertrain is required. An air conditioning system including an air conditioner is one of such auxiliary machinery.

Such the air conditioning system includes a compressor. The compressor selectively receives an engine torque transmitted through a pulley by engaging or disengaging operation of an electric clutch and compresses a cooling medium flowing in from an evaporator. After that, the compressor flows the cooling medium out to a condenser. Various types of compressors exist, and compressors of variable-capacity type are widely used for vehicles.

According to the compressor of variable-capacity type, a pressure control valve changes pressure of the cooling medium based on a load, and thereby, an angle of an inclined plate can be controlled. If the angle of the inclined plate is changed, stroke of a piston changes, and accordingly, discharge flux of the cooling medium can also be controlled.

A great amount of driving torque is required for operating the compressor. Particularly, since the compressor receives the driving torque by the pulley connected to a crankshaft of an engine through a belt, the compressor is operated according to an engine speed irrelevant to a target cooling performance. In addition, since occupants operate the air conditioning system for their comfort, the compressor may operate excessively and fuel efficiency may be deteriorated. These problems mainly occur when acceleration or deceleration.

The information disclosed in this Background section is only for enhancement of understanding of the general background of the invention and should not be taken as an acknowledgement or any form of suggestion that this information forms the prior art already known to a person skilled in the art.

SUMMARY OF THE INVENTION

Various aspects of the present invention have been made in an effort to provide a device and a method for controlling a compressor of vehicles having advantages of improving fuel efficiency as a consequence that a cold air energy is accumulated by increasing an operation of the compressor when a speed-reducing condition occurs, and the accumulated cold air energy is used when a release condition occurs.

A device for controlling a compressor of vehicles according to various aspects of the present invention may include a sensor module including a cabin temperature sensor detecting a cabin temperature of the vehicle, an outdoor temperature sensor detecting an outdoor temperature of the vehicle, an evaporator temperature sensor detecting a temperature of a cooling medium in an evaporator (evaporator temperature), a vehicle speed sensor detecting a vehicle speed, and a brake sensor detecting an operation of a brake pedal, an injector injecting a fuel for driving the vehicle, an air conditioning system including a condenser condensing and liquefying the cooling medium, an evaporator evaporating the liquefied cooling medium, the compressor compressing the cooling medium, a temperature control door controlling a temperature of an air flowed in a cabin of the vehicle, an intake door selectively flowing an inner air or an outer air in the cabin of the vehicle, and a blower blowing the air to the intake door, and a controller controlling operations of the injector and the air conditioning system, wherein the controller accumulates a cold air energy by increasing an operation of the compressor in a case that a speed-reducing condition occurs, and the air conditioning system uses the accumulated cold air energy by decreasing the operation of the compressor in a case that a release condition occurs.

The controller may increase the operation of the compressor until the evaporator temperature reaches a first target temperature in a case that the speed-reducing condition occurs.

The controller may control the temperature control door to raise the temperature of the air supplied to the cabin in a case that the evaporator temperature is lower than a second target temperature during increasing the operation of the compressor.

The controller may decrease the operation of the compressor until the evaporator temperature is higher than or equal to an allowable temperature in a case that the release condition occurs.

The controller may control the temperature control door to lower the temperature of the air supplied to the cabin in a case that the evaporator temperature is higher than a second target temperature during decreasing the operation of the compressor.

Control of the temperature control door by the controller may include control of the intake door through which the inner air or the outer air selectively flows in the cabin and control of blowing speed of the blower.

The controller may increase the operation of the compressor according to a target increasing rate of the operation of the compressor in a case that the evaporator temperature is higher than or equal to the allowable temperature.

The controller may increase the operation of the compressor until the operation of the compressor reaches a target operation of the compressor.

The controller may control the temperature control door to lower the temperature of the air supplied to the cabin in a case that the evaporator temperature is higher than the second target temperature during increasing the operation of the compressor.

Control of the temperature control door by the controller may include control of the intake door through which the inner air or the outer air selectively flows in the cabin and control of blowing speed of the blower.

A method for controlling a compressor of vehicles according to other aspects of the present invention may include a) determining whether a speed-reducing condition occurs, b) determining, in a case that the speed-reducing condition occurs, whether an evaporator temperature is higher than a first target temperature, c) increasing, in a case that the evaporator temperature is higher than the first target temperature, an operation of the compressor based on a difference between the evaporator temperature and the first target temperature, d) determining whether the evaporator temperature is lower than a second target temperature during increasing the operation of the compressor, and e) raising the temperature of the air supplied to the cabin by controlling the temperature control door in a case that the evaporator temperature is lower than the second target temperature.

The speed-reducing condition may occur when a driving condition of an engine is a fuel cut state, or when a vehicle speed is faster than a predetermined vehicle speed and a brake is operated.

The method may further include g) determining whether a release condition occurs, wherein the steps b) to e) are repeated in a case that the release condition does not occur at the step g).

In a case that the evaporator temperature is lower than or equal to the first target temperature at the step b) or the release condition occurs at the step g), the method may further include h) determining whether the evaporator temperature is lower than an allowable temperature, i) decreasing, in a case that the evaporator temperature is lower than the allowable temperature, the operation of the compressor based on a difference between the evaporator temperature and the allowable temperature, j) determining whether the evaporator temperature is higher than the second target temperature, and k) lowering, in a case that the evaporator temperature is higher than the second target temperature, the temperature of the air supplied to the cabin by controlling the temperature control door, the intake door, and the blower.

The intake door may be controlled based on a difference between a cabin temperature and an outdoor temperature or the outdoor temperature, and the blower may be controlled based on an inner air ratio at the step k).

The steps h) to k) may be repeated, in a case that the evaporator temperature is lower than or equal to the second target temperature at the step j) or the step k) is performed.

In a case that the evaporator temperature is higher than or equal to the allowable temperature at the step h), the method may further include l) increasing the operation of the compressor according to a target increasing rate of the operation of the compressor, m) determining whether the operation of the compressor is lower than a target operation of the compressor, n) determining, in a case that the operation of the compressor is lower than the target operation of the compressor, whether the evaporator temperature is higher than the second target temperature, and o) lowering, in a case that the evaporator temperature is higher than the second target temperature, the temperature of the air supplied to the cabin by controlling the temperature control door, the intake door, and the blower.

The intake door may be controlled based on the difference between the cabin temperature and the outdoor temperature or the outdoor temperature, and the blower may be controlled based on the inner air ratio at the step o).

The steps l) to o) may be repeated, in a case that the evaporator temperature is lower than or equal to the second target temperature at the step n) or the step o) is performed.

Controlling the compressor may be finished when the operation of the compressor reaches the target operation of the compressor at the step m).

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
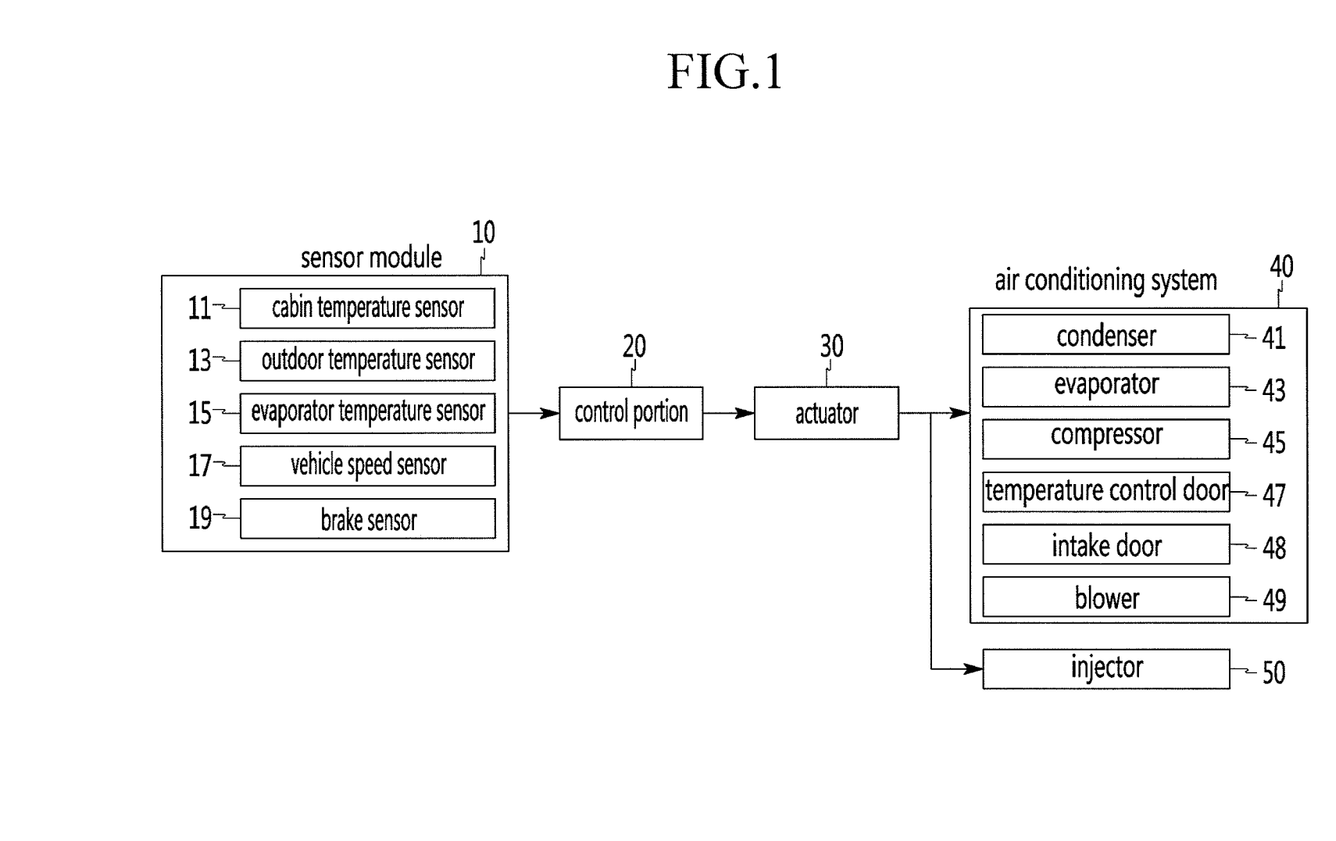
FIG. 1 is a block diagram of an exemplary device for controlling a compressor of vehicles according to the present invention.

As shown in FIG. 1, a device for controlling a compressor of vehicles according to various embodiments of the present invention includes a sensor module 10, a control portion 20, an actuator 30, an air conditioning system 40, and an injector 50.

The sensor module 10 includes a cabin temperature sensor 11, an outdoor temperature sensor 13, an evaporator temperature sensor 15, a vehicle speed sensor 17, and a brake sensor 19. Additionally, the sensor module 10 further includes sensors for shifting (e.g., a throttle position sensor, an engine speed sensor, and so on) and/or sensors for controlling an engine (e.g., an exhaust temperature sensor, an oxygen sensor, and so on).

The cabin temperature sensor 11 detects a cabin temperature of the vehicle and transmits a signal corresponding thereto to the control portion 20.

The outdoor temperature sensor 13 detects an outer temperature of the vehicle and transmits a signal corresponding thereto to the control portion 20.

The evaporator temperature sensor 15 detects a temperature of a cooling medium passing through an evaporator and transmits a signal corresponding thereto to the control portion 20.

The vehicle speed sensor 17 detects a vehicle speed from a rotation speed of a wheel and transmits a signal corresponding thereto to the control portion 20.

The brake sensor 19 detects an operation of a brake pedal and transmits a signal corresponding thereto to the control portion 20.

The control portion 20 is electrically connected to the sensor module 10 so as to receive signals corresponding to values detected by the sensor module 10, and controls the injector 50 and the air conditioning system 40 based on the signals. Various control units such as a transmission control unit controlling a transmission of the vehicle, an engine control unit controlling the engine, and an air conditioning system control unit controlling the air conditioning system 40 may be used in the vehicle, and the control portion 20 in this specification includes all the control units used in the vehicle. Particularly, it is to be understood that the control portion 20 includes all the control portions suitable to perform a method for controlling a compressor according to various embodiments of the present invention.

The actuator 30 is electrically connected to the control portion 20 and operates the air conditioning system 40 and/or the injector 50 according to a control signal transmitted from the control portion 20. A solenoid device may be used as the actuator 30, and the control signal may be a duty signal applied to the solenoid device.

The air conditioning system 40 includes all the devices used for warming, ventilating, and cooling the cabin of the vehicle. Concretely, the air conditioning system 40 includes a condenser 41, an evaporator 43, a compressor 45, a temperature control door 47, an intake door 48, and a blower 49. The air conditioning system 40 may include various components which are not described in this specification.

The condenser 41 condenses and liquefies the cooling medium, the evaporator 43 evaporates the liquefied cooling medium, and the compressor 45 compresses the cooling medium.

In addition, the temperature control door 47 controls a temperature of an air supplied to the cabin of the vehicle by mixing a warm air with a cool air, the intake door 48 controls an inner air, an outer air or a mixture of the inner and outer airs to flow in the cabin of the vehicle, the blower 49 blows the air toward the intake door.

Such an air conditioning system 40 is well known to a person of an ordinary skill in the art, and a detailed description thereof will be omitted.

The injector 50 injects a fuel so as to drive the vehicle (particularly, the engine).

Figure 2:
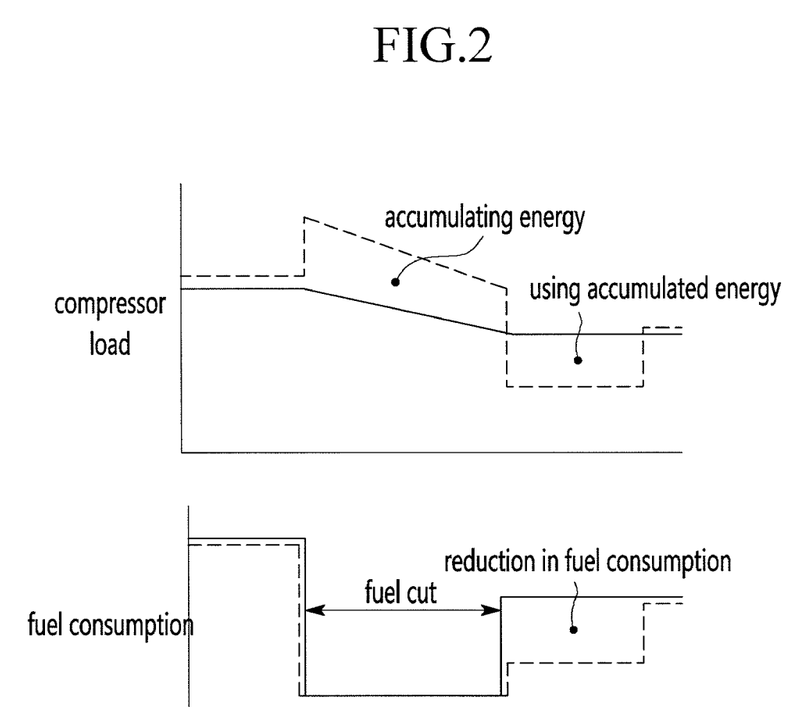
FIG. 2 is a graph explaining the spirit of the present invention.

A solid line in FIG. 2 represents an operation (load) of the compressor and a fuel consumption according to the prior arts, and a dotted line represents an operation (load) of the compressor and a fuel consumption according to various embodiments of the present invention.

If a speed-reducing condition of the vehicle (particularly, fuel cut condition) occurs, the fuel consumption is quickly reduced and the operation of the compressor is gradually reduced according to the conventional arts. On the contrary, if a release condition occurs, the fuel consumption is quickly increased and the operation of the compressor is maintained as a predetermined operation.

According to the spirit of the present invention, fuel consumption is quickly reduced but the operation of the compressor is gradually reduced after being quickly increased if the speed-reducing condition of the vehicle occurs. That is, if the speed-reducing condition of the vehicle occurs, the operation of the compressor is increased so as to accumulate cold air energy. After that, if the release condition occurs, the fuel consumption is increased a little and the operation of the compressor is reduced quickly. That is, the air conditioning system 40 is operated by the cold air energy accumulated when the vehicle slows down. Therefore, fuel consumption for operating the air conditioning system 40 is reduced.

Finally, if the accumulated cold air energy is used up, the fuel consumption and the operation of the compressor are controlled through the same way as the conventional art.

A method for controlling a compressor for vehicles realizing the spirit of the present invention will be described with reference to FIG. 3 to FIG. 7.

Figure 3:
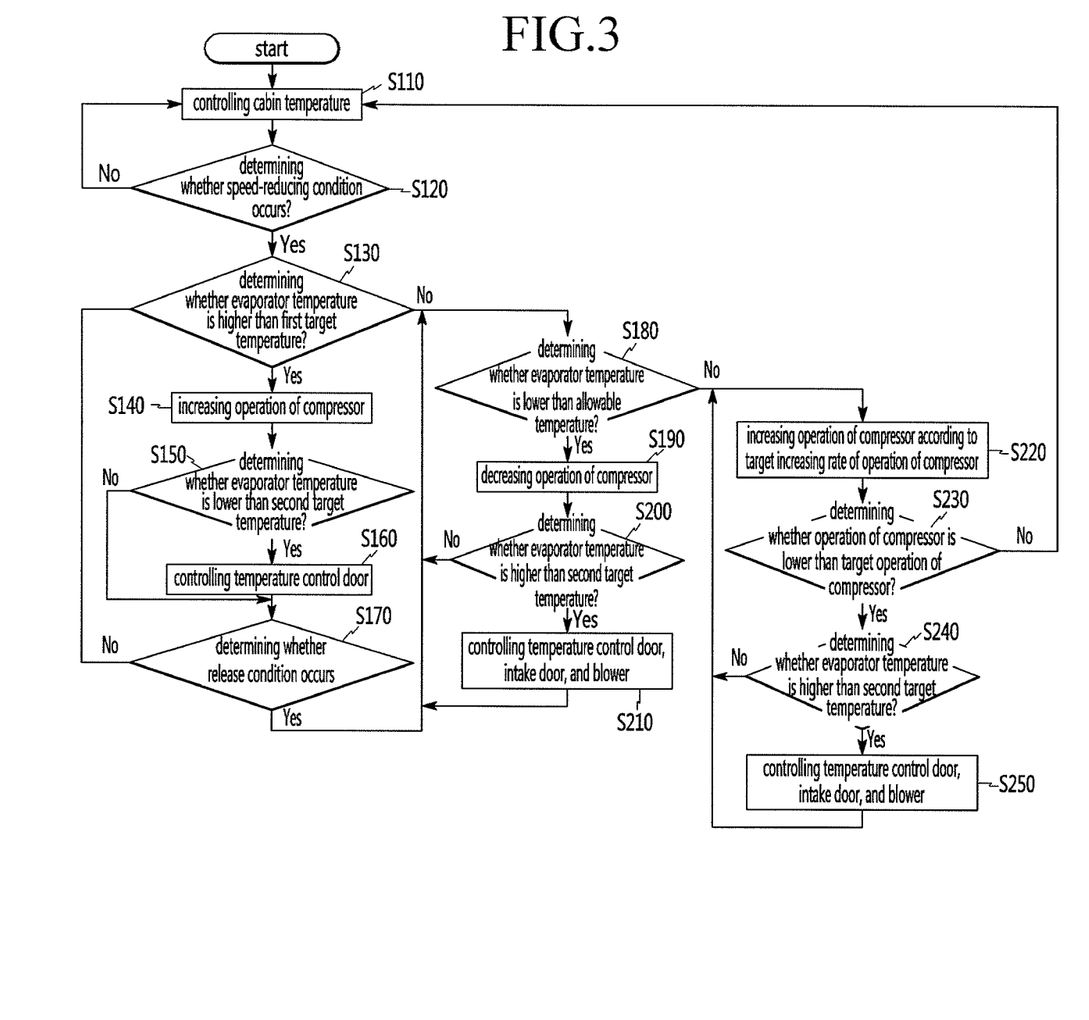
FIG. 3 is a flowchart of a method for controlling an exemplary compressor of vehicles according to the present invention.

As shown in FIG. 3, in a state that the vehicle runs, the control portion 20 controls the cabin temperature of the vehicle at a step S110. At this state, the control portion 20 determines whether the speed-reducing condition occurs at a step S120. The speed-reducing condition occurs when a fuel cut state occurs or the brake pedal is operated in a state that the vehicle speed is faster than a predetermined vehicle speed. Herein, the occurrence of fuel cut state is decided by a signal corresponding to a fuel injection amount received from the injector 50. On the contrary, it may be determined based on the signal transmitted to the sensor module 10 whether a predetermined occurrence condition of the fuel cut state is satisfied. Meanwhile, if the vehicle speed is lower than the predetermined vehicle speed, a regenerable kinetic energy is small. Therefore, if the operation of the compressor is increased, the fuel injection amount also increases. Therefore, it may be set that the speed-reducing condition for performing the method for controlling the compressor according to various embodiments of the present invention is satisfied only when the brake pedal operates in the state that the vehicle speed is faster than the predetermined vehicle speed. The predetermined vehicle speed may be 20-40 km/h.

If the speed-reducing condition does not occur at the step S120, the control portion 20 continues the control of the cabin temperature at the step S110.

If the speed-reducing condition occurs at the step S120, the control portion 20 determines whether the evaporator temperature is higher than a first target temperature at a step S130. Herein, the evaporator temperature represents a temperature of the cooling medium passing through the evaporator 43. The first target temperature is a temperature (0-4° C.) where the evaporator begins to be frozen. The reason why the first target temperature is set as described above is to increase the operation of the compressor as much as possible before the evaporator is frozen. If the evaporator is frozen, heat-exchanging efficiency is lowered and fuel efficiency is actually deteriorated.

If the evaporator temperature is lower than or equal to the first target temperature at the step S130, the operation of the compressor cannot be increased. Thus, the method according to various embodiments of the present invention proceeds to a step S180.

Figure 4:
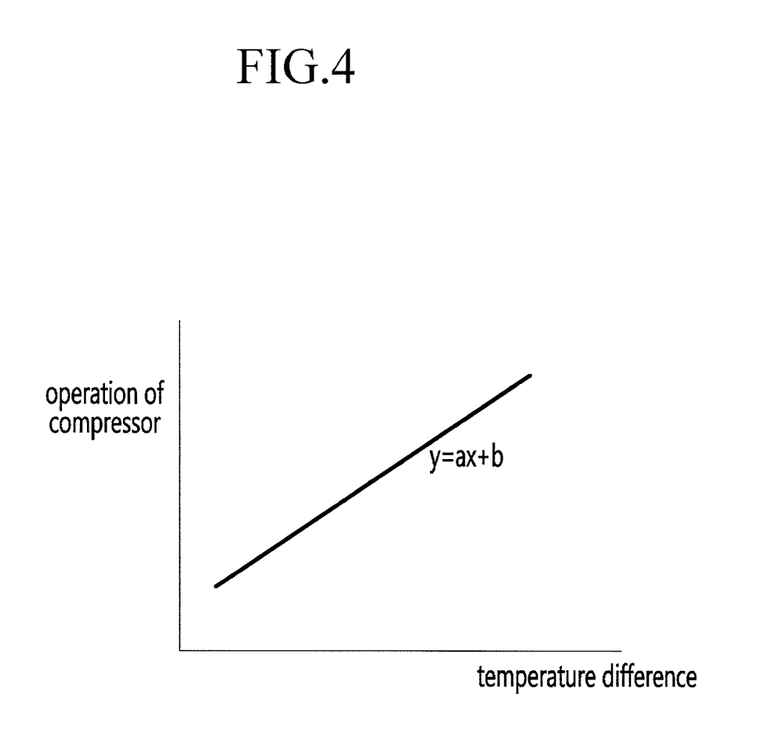
FIG. 4 is a graph showing an exemplary relation between an operation of a compressor and a temperature difference.

If the evaporator temperature is higher than the first target temperature at the step S130, the control portion 20 increases the operation of the compressor at a step S140. The operation of the compressor, as shown in FIG. 4, is increased based on a difference between the evaporator temperature and the first target temperature. That is, the increase amount of the operation according to the temperature difference is defined in a map. Herein, it is exemplary shown that the operation amount is proportional to the temperature difference, but the spirit of the present invention is not limited to this.

Meanwhile, in a case that the operation of the compressor is increased, the control portion 20 may decide that a load of the vehicle increases and may increase a fuel injection amount of the injector 50. Thereby, the fuel efficiency may be deteriorated. Therefore, in a case that the operation of the compressor is increased because of the occurrence of the speed-reducing condition, the increase of the fuel injection amount is prohibited.

After that, the control portion 20 determines whether the evaporator temperature is lower than a second target temperature at a step S150. Generally, if the evaporator temperature is lowered, the temperature of the air supplied to the cabin is also lowered. Thereby, comfort of the cabin may be deteriorated. Therefore, if the evaporator temperature is lower than the second target temperature at the step S150, the control portion 20 controls the temperature control door 47 to compensate an excessive decrease in the cabin temperature at a step S160. That is, a cold air supplied to the cabin is warmed up by a heater or is mixed with a warm air passing through the heater such that the air with suitable temperature should be supplied to the cabin. Such a temperature control door 47 is controlled based on a difference between the temperature of the air supplied to the cabin at the step S110 and a current temperature of the air supplied to the temperature control door 47. After that, the control portion 20 proceeds to a step S170.

If the evaporator temperature is higher than or equal to the second target temperature at the step S150, the control portion 20 does not control the temperature control door 47 but proceeds to the step S170.

The control portion 20 determines whether the release condition occurs at the step S170. The release condition may be satisfied when the speed-reducing condition is not satisfied. If the release condition does not occur at the step S170, the control portion 20 continuously performs the steps S130 to S170, repeatedly. That is, the control portion 20 continues to increase the operation of the compressor so as to accumulate the cold air energy. If the release condition occurs at the step S170, the control portion 20 proceeds to the step S180. In this case, since the release condition occurs, the control portion 20 uses the accumulated cold air energy.

At the step S180, the control portion determines whether the evaporator temperature is lower than an allowable temperature. The allowable temperature means an evaporator temperature corresponding to the temperature of the air required for maintaining the comfort of the cabin. If the operation of the compressor is decreased after the release condition occurs, the temperature of the air supplied to the cabin is raised. At this time, the operation of the compressor should be increased so as to lower the temperature of the air supplied to the cabin. Therefore, the operation of the compressor is decreased until the evaporator temperature reaches the allowable temperature. Therefore, the evaporator temperature is higher than or equal to the allowable temperature at the step S180, the control portion 20 proceeds to a step S220. On the contrary, if the evaporator temperature is lower than the allowable temperature at the step S180, the control portion 20 decreases the operation of the compressor at a step S190. The operation of the compressor is decreased based on a difference between the evaporator temperature and the allowable temperature (refer to FIG. 4).

Figure 5:
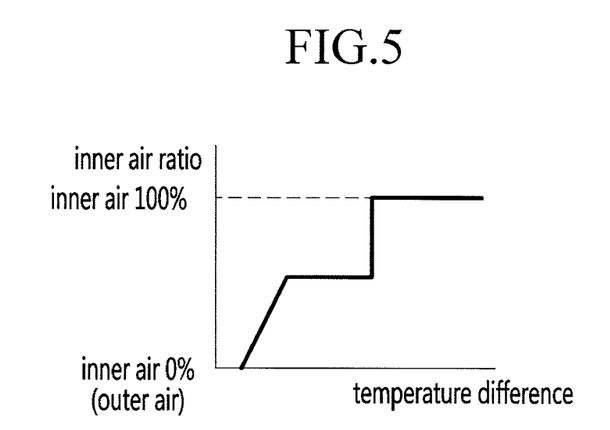
FIG. 5 is a graph showing an inner air ratio according to a temperature difference.
Figure 6:
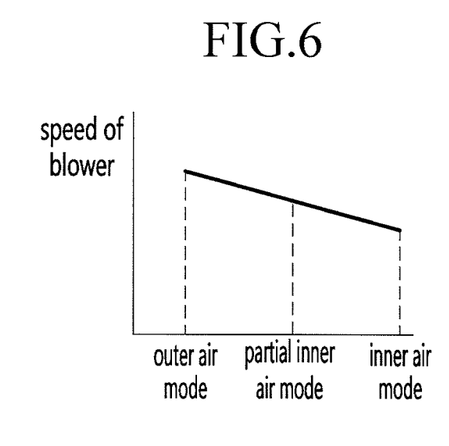
FIG. 6 is a graph showing a blower speed respectively at an outer air mode, a partial inner air mode, and an inner air mode.

After that, the control portion 20 determines whether the evaporator temperature is higher than the second target temperature at a step S200. If the operation of the compressor is decreased, the temperature of the air supplied to the cabin is raised. Therefore, if the evaporator temperature is higher than the second target temperature at the step S200, the control portion 20 controls the temperature control door 47, the intake door 48, and the blower 49 so as to suppress a rise of the temperature of the air supplied to the cabin at a step S210. That is, the temperature control door 47 is controlled based on the difference between the temperature of the air supplied to the cabin at the step S110 and the current temperature of the air supplied to the temperature control door 47. The intake door 48, as shown in FIG. 5, is controlled based on a difference between the cabin temperature and the outdoor temperature or the outdoor temperature. A speed of the blower 49, as shown in FIG. 6, is controlled based on an inner air ratio (a ratio of the inner air to the air supplied to the cabin).

Explaining concretely, the temperature control door 47 is controlled to lower the temperature of the air supplied to the cabin. For this purpose, a ratio of the inner air and the outer air is controlled through the intake door 48, and speeds of the inner air and the outer air are controlled through the blower 49.

If the evaporator temperature is lower than or equal to the second target temperature at the step S200, the control portion 20 continuously performs the steps S180 to S200, repeatedly.

Steps S220 to S250 are steps for preparing a normal operation of the compressor 45 after the accumulated cold air energy is used up. If the evaporator temperature is higher than or equal to the allowable temperature at the step S180, the temperature of the air supplied to the cabin is higher than that of the air required for maintaining the comfort of the cabin. In this case, the temperature of the air supplied to the cabin is lowered by raising the operation of the compressor to a target operation of the compressor and the cabin temperature control is performed normally. At this time, if the operation of the compressor is raised quickly, the injection amount of the fuel increases. Therefore, the operation of the compressor is gradually increased so as to prevent the fuel efficiency and the comfort from being deteriorated.

Figure 7:
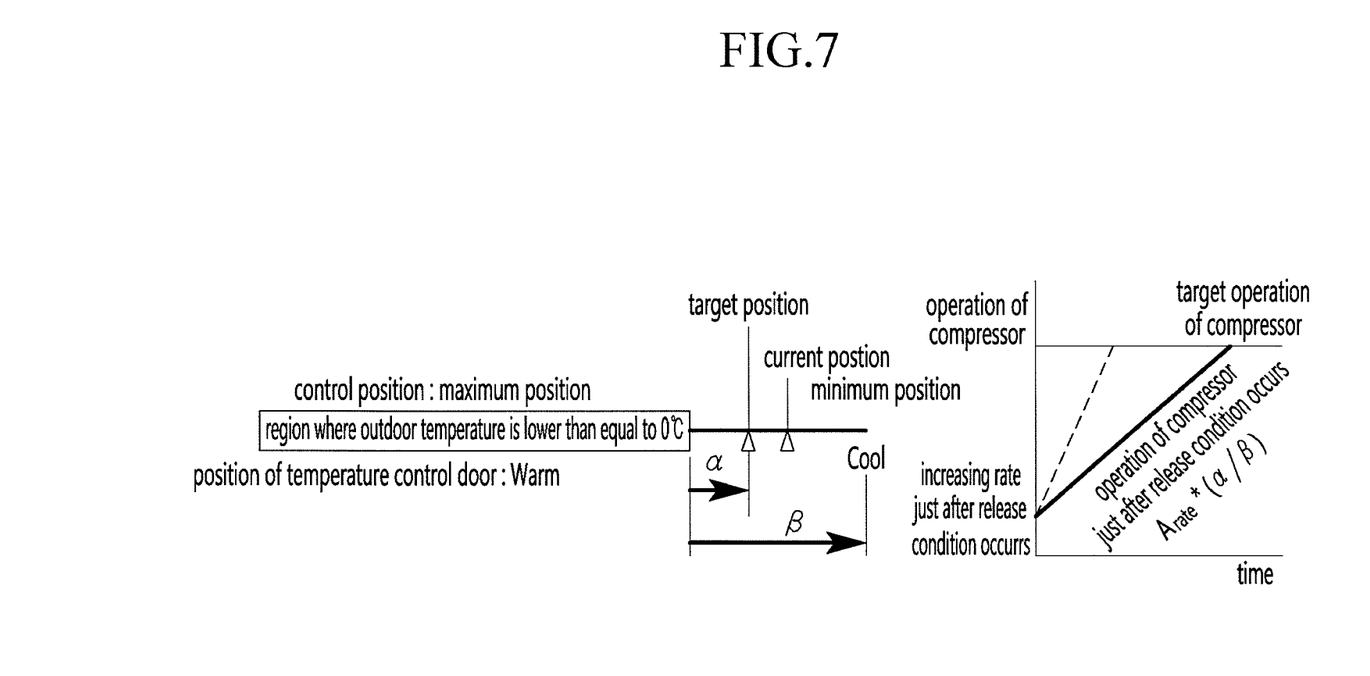
FIG. 7 is a graph showing an exemplary operation of a compressor to time.

For this purpose, the control portion 20 increases the operation of the compressor according to a target increasing rate of the operation of the compressor at the step S220. The target increasing rate of the operation of the compressor, as shown in FIG. 7, is calculated according to a target position of the temperature control door 47 and a reference target increasing rate of the operation of the compressor. The target increasing rate of the operation of the compressor $A_{rate}$ is represented as a dotted line in a right graph in FIG. 7. That is, assuming that a distance from a predetermined position of the temperature control door when the outdoor temperature is 0° C. to the target position of the temperature control door is $\alpha$ and a distance from the predetermined position of the temperature control door when the outdoor temperature is 0° C. to a minimum position of the temperature control door is $\beta$, the target increasing rate of the operation of the compressor $A_{target}$ is calculated from a following equation.

$$A_{target} = A_{rate} * (\alpha/\beta) \qquad \text{Eq. (a)}$$

The reference target increasing rate of the operation of the compressor $A_{rate}$ represents an increasing rate of the operation of the compressor used for increasing the operation of the compressor at a normal state. Since the operation of the compressor is increased according to the target increasing rate of the operation of the compressor $A_{target}$ that is lower than the reference target increasing rate of the operation of the compressor in various embodiments of the present invention, the operation of the compressor may be prevented from being increased quickly. Therefore, deterioration of the fuel efficiency may be prevented.

After performing the step S220, the control portion 20 determines whether the operation of the compressor is lower than the target operation of the compressor at the step S230. That is, it is determined whether the operation of the compressor reaches the target operation of the compressor. If the operation of the compressor reaches the target operation of the compressor at the step S230, the control portion 20 finishes the method for controlling the compressor according to various embodiments of the present invention and returns to the step S110. If the operation of the compressor is lower than the target operation of the compressor at the step S230, the control portion 20 determines whether the evaporator temperature is higher than the second target temperature at the step S240.

If the evaporator temperature is lower than or equal to the second target temperature at the step S240, the control portion 20 continuously performs the steps S220 to S240, repeatedly.

If the evaporator temperature is higher than the second target temperature at the step S240, the control portion 20 controls the temperature control door 47, the intake door 48, and the blower 49 so as to suppress the rise of the temperature of the air supplied to the cabin at the step S250. Since the step S250 is the same as the step S210, a detailed description thereof will be omitted.

As described above, a cold air energy may be accumulated according to the present invention by suppressing an increase in an injection amount of a fuel when decelerating and increasing an operation of a compressor. Since the cold air energy accumulated as described above is used when the deceleration is released, fuel efficiency may improve.

Since the operation of the compressor is controlled such that the evaporator is lowered to a temperature where the evaporator begins to be frozen, accumulating efficiency of the cold air energy can be maximized. In addition, since the operation of the compressor is increased under the condition that the evaporator is not frozen, heat-exchanging efficiency may increase.

Further, since the temperature control door is controlled such that a temperature of air supplied to a cabin is prevented from being lowered as the evaporator temperature is lowered, comfort of the cabin may be maintained.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for controlling a compressor of a vehicle provided with an air conditioning system including a condenser condensing and liquefying a cooling medium, an evaporator evaporating the liquefied cooling medium, the compressor compressing the cooling medium, a temperature control door controlling a temperature of air flowing into a cabin of the vehicle, an intake door selectively distributing an inner air or an outer air into the cabin of the vehicle, and a blower blowing the air to the intake door, the method comprising:
    a) determining, by a controller, whether a speed-reducing condition occurs;
    b) determining, by the controller, in a case that the speed-reducing condition occurs, whether an evaporator temperature detected by an evaporator temperature sensor which is configured to detect the evaporator temperature of the liquefied cooling medium in the evaporator is higher than a first target temperature;
    c) increasing, by the controller, in a case that the detected evaporator temperature is higher than the first target temperature, a load of the compressor based on a difference between the detected evaporator temperature of the liquefied cooling medium in the evaporator and the first target temperature;
    d) determining, by the controller, whether the detected evaporator temperature of the liquefied cooling medium in the evaporator is lower than a second target temperature during increasing the load of the compressor; and
    e) raising, by the controller, the temperature of the air supplied to the cabin by controlling the temperature control door in a case that the detected evaporator temperature of the liquefied cooling medium in the evaporator is lower than the second target temperature,
    wherein the steps d) and e) are performed while the compressor is operated at the increased load as provided by the step c).

2. The method of claim 1, wherein the speed-reducing condition occurs when a driving condition of an engine is a fuel cut state, or when a vehicle speed is faster than a predetermined vehicle speed and a brake is operated.

3. The method of claim 1, further comprising g) determining whether a release condition occurs,
    wherein the steps b) to e) are repeated in a case that the release condition does not occur at the step g).

4. The method of claim 3, in a case that the detected evaporator temperature is lower than or equal to the first target temperature at the step b) or the release condition occurs at the step g), further comprising:
    h) determining whether the detected evaporator temperature is lower than an allowable temperature;
    i) decreasing, in a case that the detected evaporator temperature is lower than the allowable temperature, the load of the compressor based on a difference between the detected evaporator temperature and the allowable temperature;
    j) determining whether the detected evaporator temperature is higher than the second target temperature; and
    k) lowering, in a case that the detected evaporator temperature is higher than the second target temperature, the temperature of the air supplied to the cabin by controlling the temperature control door, the intake door, and the blower.

5. The method of claim 4, wherein the intake door is controlled based on a difference between a cabin temperature and an outdoor temperature or the outdoor temperature, and the blower is controlled based on an inner air ratio at the step k).

6. The method of claim 4, wherein the steps h) to k) are repeated, in a case that the detected evaporator temperature is lower than or equal to the second target temperature at the step j) or the step k) is performed.

7. The method of claim 4, in a case that the detected evaporator temperature is higher than or equal to the allowable temperature at the step h), further comprising:
   l) increasing the load of the compressor according to a target increasing rate of the load of the compressor;
   m) determining whether the load of the compressor is lower than a target load of the compressor;
   n) determining, in a case that the load of the compressor is lower than the target load of the compressor, whether the detected evaporator temperature is higher than the second target temperature; and
   o) lowering, in a case that the detected evaporator temperature is higher than the second target temperature, the temperature of the air supplied to the cabin by controlling the temperature control door, the intake door, and the blower.

8. The method of claim 7, wherein the intake door is controlled based on the difference between the cabin temperature and the outdoor temperature or the outdoor temperature, and the blower is controlled based on the inner air ratio at the step o).

9. The method of claim 7, wherein the steps l) to o) are repeated, in a case that the detected evaporator temperature is lower than or equal to the second target temperature at the step n) or the step o) is performed.

10. The method of claim 7, wherein controlling the compressor is finished when the load of the compressor reaches the target load of the compressor at the step m).

* * * * *